No. 671,700. Patented Apr. 9, 1901.
W. JENNINGS.
TIRE FASTENER.
(Application filed Oct. 12, 1900.)
(No Model.) 2 Sheets—Sheet 1.

Witnesses:
J. F. Groat.
H. F. Bernhard

William Jennings, Inventor
By Marion & Marion
Attorneys

No. 671,700. Patented Apr. 9, 1901.
W. JENNINGS.
TIRE FASTENER.
(Application filed Oct. 12, 1900.)
(No Model.) 2 Sheets—Sheet 2.

Witnesses:
J. F. Groat.
H. F. Bernhard.

William Jennings, Inventor
By Marion & Marion
Attorneys

UNITED STATES PATENT OFFICE.

WILLIAM JENNINGS, OF MONTREAL, CANADA.

TIRE-FASTENER.

SPECIFICATION forming part of Letters Patent No. 671,700, dated April 9, 1901.

Application filed October 12, 1900. Serial No. 32,815. (No model.)

*To all whom it may concern:*

Be it known that I, WILLIAM JENNINGS, a subject of Her Majesty the Queen of Great Britain, residing in the city and district of Montreal, Province of Quebec, Canada, have invented certain new and useful Improvements in Tire-Fasteners; and I do hereby declare that the following is a full, clear, and exact description of the invention, such as will enable others skilled in the art to which it appertains to make and use the same.

In the art of applying rubber or other elastic tires to the rims of the wheels for carriages and other vehicles it is desirable to provide a simple and secure fastener for the meeting or adjacent ends of a band, tape, ribbon, or wire. Prior to my invention it has been customary to electrically weld the adjacent ends of the tire-fastener, and in other instances the fastener-band has been brazed together; but it is obvious that machinery must be employed in the welding and brazing operations, the cost of which machines prohibits the general use of such systems. It has also been proposed to mechanically couple the meeting ends of a wire or tape by various forms of devices, one of the prominent types of which couplers consists of a right and left threaded nut adapted to simultaneously engage the correspondingly right and left threaded ends of the wire, so as to draw the latter together. From experiments which I have made with a device of this type it is found that owing to the compression under which the tire is held during the process of applying it to the wheel it is extremely difficult to draw the two portions of the wire together through the agency of such a coupler, such operation being both tedious and expensive.

In the present invention it is my object to provide a simple fastener which will securely hold the two ends of the wire together, which may be applied with comparative ease and quickness, and which will be cheap in construction.

Further objects and advantages of the invention will appear in the course of the subjoined description, and the novelty in the construction and arrangement of parts will be defined by the claim.

Figure 1:
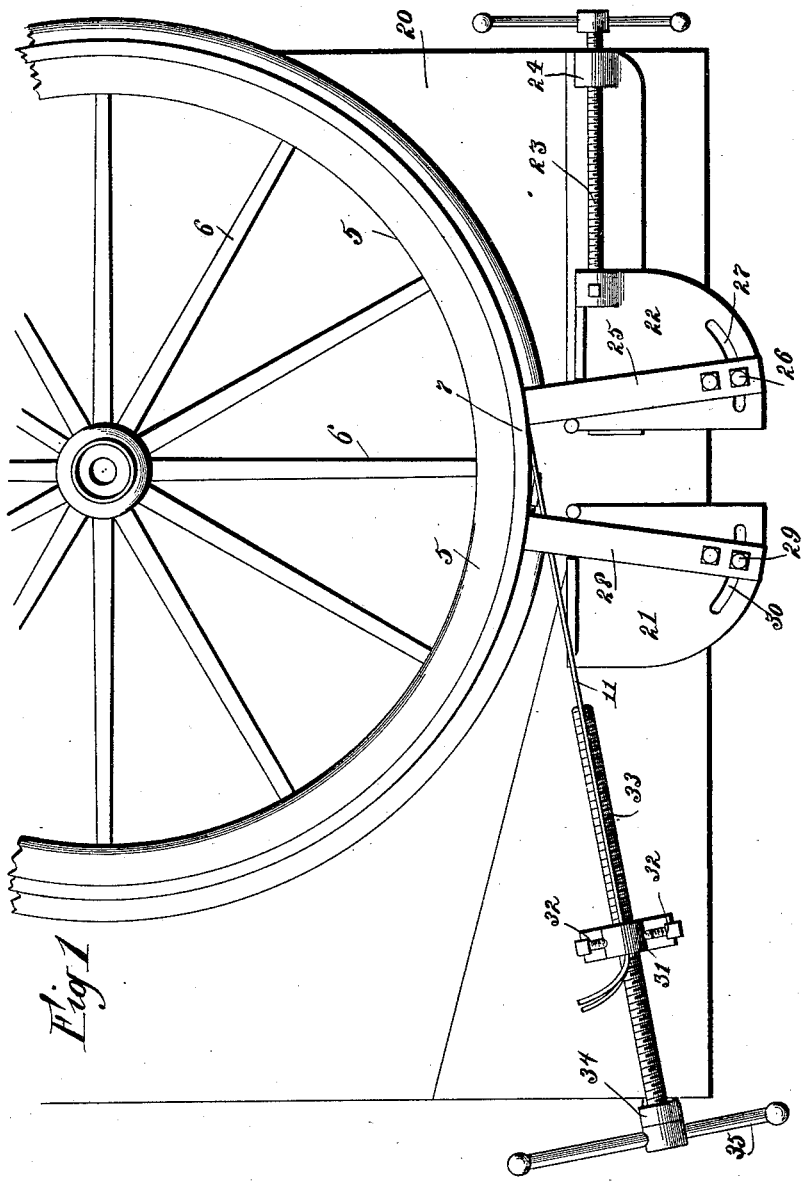
Figure 2:
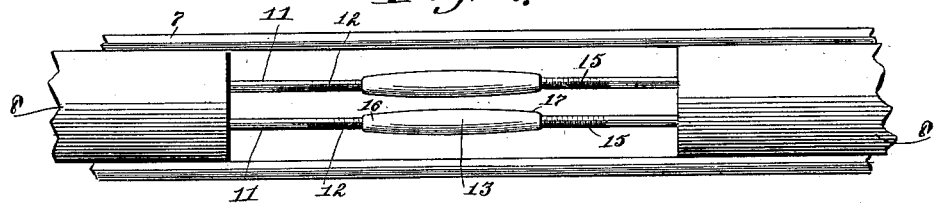
Figure 3:
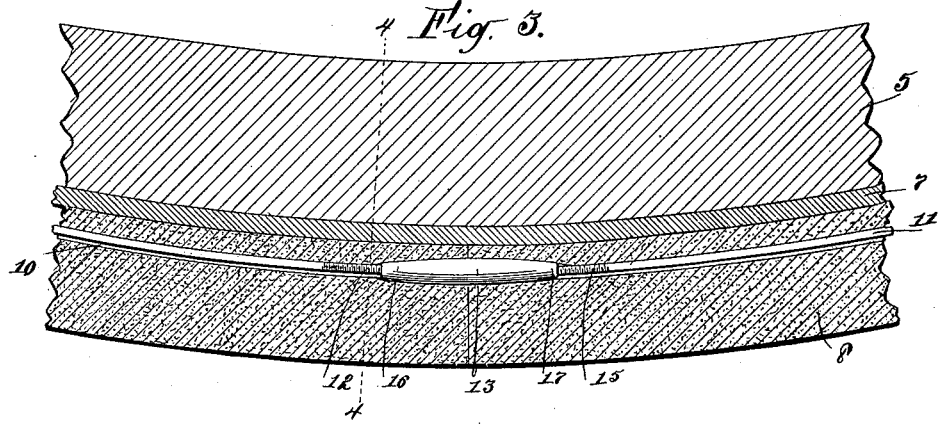
Figure 4:
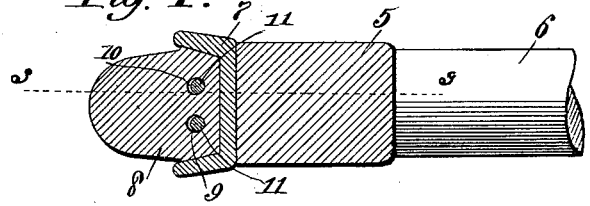
Figure 5:
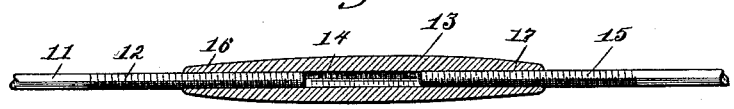

In the drawings hereto annexed, forming a part of this specification, Figure 1 is a plan view of an apparatus for applying rubber tires to an ordinary vehicle-wheel, said apparatus adapted to be used in connection with a tire-fastener, which forms the subject-matter of this application. Fig. 2 is an elevation, with parts broken away, showing a portion of the wheel-rim and the adjacent separated portions of a compressed tire. The space between the portions of the tire is spanned by the improved tire-fastener. Fig. 3 is a detail longitudinal sectional view in the plane of the dotted line 3 3 on Fig. 4. Fig. 4 is a vertical transverse section in the plane of the dotted line 4 4 on Fig. 3. Fig. 5 is an enlarged detail illustrating the sleeve engaging with the correspondingly-threaded portions of the opposite ends of the fastening wire or rod.

The same numerals of reference denote like parts in each figure of the drawings.

5 designates a portion of the felly, and 6 are the spokes of an ordinary vehicle-wheel. It is customary to employ a channeled metallic rim 7 in connection with the felly of a wooden wheel, and in this rim is seated an elastic tire 8, which is ordinarily made of rubber. This tire is provided near its inner seat portion with the longitudinal passages 9 10, the same arranged parallel to each other and extending throughout the length of the tire, and all these parts are of the usual or any preferred construction known to the trade. Hence no novelty therefor is claimed in this application.

In the application of the rubber tire to a channeled wheel-rim it is now the practice of those skilled in the art to place this tire under compression, so that it will be understood that the total length of a tire previous to compression exceeds the lineal measurement of the wheel circumference. As one example of the compression to which the tire is subjected I may mention that a tire to fit a wheel-rim six feet in circumference should measure seven feet in length before it is compressed, and in view of this statement it is to be understood that it is customary to allow one inch for each foot in length of the tire for the purpose of allowing the latter to be compressed. Previous to adjusting the tire to the wheel-rim or compressing the same in order to snugly fit the rim I run the fastening-wires 11 through the longitudinal passages 9 10, and one end of each wire is provided with a screw-thread 12, preferably a right-hand thread. The length of this screw-thread 12 is equal to the length of a coupling-sleeve 13, the latter being provided with a longitudinal passage or opening, which is of uniform diameter throughout its length and is provided with a single continuous screw-thread 14, which corresponds to the screw-thread 12. This continuous thread of the elongated coupling-sleeve permits the latter to be screwed on the threaded end 12 of the rod or wire, so as to have the end of the coupling-sleeve lie practically flush with the threaded end 12 of the wire previous to the adjustment of the sleeve. Each fastening-wire 11 extends longitudinally throughout the full length of the tire, the other end of said wire projecting beyond the opposite end portion of the tire and equipped with a screw-thread 15, which, according to my invention, is essentially a right-handed thread, so as to correspond to the thread 12 on the other end of the fastening-wire. It is to be understood that this thread 15 is not cut on each fastening-wire until the operator is engaged in applying the tire to the wheel, as exemplified by Fig. 1 and as will be hereinafter more fully referred to.

Another essential feature of my invention consists in providing the elongated coupling-sleeve with the externally conical ends 16 17, said conical ends extending in opposite directions from the middle portion of the sleeve and arranged to fit friction-tight into the wire-passages 9 10 of the abutting portions of the tire at the joint thereof. As shown by Fig. 3 of the drawings, the ends of the compressed tire are adapted to be drawn together, so as to make a butt-joint which lies radially to the axis of the wheel, and this joint is spanned by the elongated coupling-sleeve 13, which has threaded engagement with the threaded ends 12 15 of each fastener-wire and which has its externally conical portions fitted friction-tight into the wire-passages of the tire. This tight fitting of the coupling-sleeves in the abutting tire portions is a very advantageous feature of the invention, because the sleeves minimize the admission of moisture or water to the wire-passages of the tire, thus preventing the wires from becoming rusted and obviating the most serious effect of the moisture or water tending to decay the tire to such an extent that the fastening-wires will serve to cut through the rubber, as has been found by practical experience.

I will now proceed to describe the mode of applying an elastic tire to a vehicle-wheel in accordance with the use of the apparatus shown by Fig. 1. This apparatus contemplates the employment of a bed 20, on which the wheel is spaced and which contains the plates 21 22, the latter being adjustable through the medium of a screw 23, which works in a threaded bearing 24. On this plate 22 is a tire-clamp 25, that is adjustably fastened in place by a bolt 26, adapted to play in a slot 27, said clamp 25 arranged to engage with the right-hand end portion of the tire in a manner to prevent the latter from moving toward the left of Fig. 1 and also to permit the fastening-wires 11 to be drawn freely through said clamp 25. Another clamp 28 is fitted on the other plate 21, so as to be held adjustably thereon by a bolt 29, the latter passing through a slot 30 in said plate 21. The projecting end portion of this clamp 28 engages with the left-hand end portion of the tire and with the end portions of the fastening-wires 11, which are formed with the threads 12, and the fastening-wires are firmly gripped in the clamp 28, which also engages with one end portion of the tire, as described. A traveling nut 31 is provided with suitable clamping-screws 32, adapted to fasten the right-hand end portions of the wires 11 in said nut, the latter being, furthermore, engaged by a power-screw 33, which works in a suitable bearing 34 and is equipped with a handle 35.

In using the apparatus the wheel is placed on the bed and the tire is adjusted so that it may easily be placed around the wheel-rim. The elongated coupling-sleeves are screwed on the threaded portions 12 of the fastener-wires, which extend through the tire, and the clamp 28 is adjusted to engage firmly with said portions 12 of the wires and with the left-hand end of the tire. The right-hand end of the tire is spaced with relation to the left-hand end, so as to allow the gap shown by Figs. 1 and 2, said right-hand end of the tire abutting against the clamp 25, while the wires 11 pass freely from the tire and through the two clamps, so as to be engaged with the traveling nut 31. It is now to be observed that the left-hand end portions of the two fastening-wires are firmly gripped by the clamp 28, and the tire has its separated end portions engaged with the clamps 25 28, respectively. The operator now rotates the screw 33, so as to give a traveling movement to the nut 31, and thereby draw the wires longitudinally through the tire, whereby the latter is placed under the desired compression, and said tire is contracted in length so as to fit snugly around the wheel-rim. This operation is continued until the tire adheres firmly to the rim, and at this time the clamp 25 is tightened, so as to engage the right-hand end portions of the two wires 11, thereby preventing any slackening of the wires during the subsequent operation of coupling the wires together. The operator now cuts the wires 11 at a suitable point, so as to sever the wires from the nut, and thereafter the right-hand end portions of said wires have the right-hand screw-threads tapped thereon. These threaded ends are now adjusted into proper relation to the threaded ends 12, and thereafter the coupling-sleeves 13 are rotated by a suitable implement, so as to partially unscrew them from the threaded ends 12 of the wires and into engagement with the threaded ends 15 of the same wires. It now only remains to disengage the clamps 25 28 from the wires and to draw the ends of the compressed rubber tire together, so that the coupling-sleeves will span the joint between the abutting ends of the tire and fit frictionally tight into the wire-passages of said tire.

No claim is herein made to the tire-applying apparatus represented by Fig. 1 of the drawings, because the same forms the subject-matter of another application.

Having thus described my invention, what I claim as new is—

The combination with a cushion-tire, of a fastener-wire extending through said tire and provided at its approximate ends with threads of corresponding hand, and a coupling-sleeve provided with a continuous screw-threaded passage and engaging with said corresponding threads at the ends of said wire, said wire being constantly strained with relation to the tire, including the period of adjusting the sleeve to couple the wire.

In witness whereof I have hereunto set my hand in the presence of two witnesses.

WILLIAM JENNINGS.

Witnesses:
  H. T. BERNHARD,
  T. MYNARD.